United States Patent
Liu et al.

(10) Patent No.: US 10,502,663 B2
(45) Date of Patent: Dec. 10, 2019

(54) WHEEL RUNOUT DETECTION DEVICE

(71) Applicant: CITIC Dicastal CO., LTD, Qinhuangdao (CN)

(72) Inventors: Weidong Liu, Qinhuangdao (CN); Shengchao Zhang, Qinhuangdao (CN); Haiping Chang, Qinhuangdao (CN); Yingfeng Wang, Qinhuangdao (CN); Yeling Tian, Qinhuangdao (CN); Dan Yao, Qinhuangdao (CN); Zegong He, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 217 days.

(21) Appl. No.: 15/840,748

(22) Filed: Dec. 13, 2017

(65) Prior Publication Data
US 2019/0033173 A1     Jan. 31, 2019

(30) Foreign Application Priority Data
Jul. 31, 2017   (CN) .......................... 2017 1 0635541

(51) Int. Cl.
  *G01B 5/255*   (2006.01)
  *G01M 17/02*   (2006.01)
  *G01M 17/013*  (2006.01)
  *G01M 1/04*    (2006.01)

(52) U.S. Cl.
  CPC .......... *G01M 17/021* (2013.01); *G01M 1/045* (2013.01); *G01M 17/013* (2013.01)

(58) Field of Classification Search
  CPC ................................................. G01M 17/021
  USPC ................................................ 33/203, 203.12
  See application file for complete search history.

(56) References Cited

U.S. PATENT DOCUMENTS

| | | | | |
|---|---|---|---|---|
| 3,279,084 A | * | 10/1966 | Hindin | G01B 5/255 33/203 |
| 4,569,140 A | * | 2/1986 | Hobson | G01B 5/255 33/203.18 |
| 4,618,300 A | | 10/1986 | Goebel | |
| 4,854,702 A | * | 8/1989 | Stieff | G01B 11/275 356/155 |
| 5,615,574 A | | 4/1997 | Drechsler et al. | |

(Continued)

FOREIGN PATENT DOCUMENTS

| | | |
|---|---|---|
| CN | 201470924 U | 5/2010 |
| CN | 203479274 U | 3/2014 |

(Continued)

*Primary Examiner* — George B Bennett
(74) *Attorney, Agent, or Firm* — Calfee, Halter & Griswold LLP

(57) ABSTRACT

The present application discloses a wheel runout detection device. A synchronous gear B is mounted on the output shaft of a servo motor, a synchronous gear A is connected with the synchronous gear B via a synchronous belt, a flange, an expansion sleeve and a cylinder are mounted on a flange plate, and two ends of a connecting shaft are respectively connected with the output shaft of the cylinder and an expansion core. The servo motor drives the flange, the expansion sleeve and the wheel to rotate via the synchronous gear A, the synchronous belt and the synchronous gear B. The device may meet the requirement of wheel runout detection in use, and has the characteristics of ideal effect, high efficiency and high working safety and reliability.

1 Claim, 4 Drawing Sheets

(56) References Cited

U.S. PATENT DOCUMENTS

| | | | |
|---|---|---|---|
| 5,919,238 A * | 7/1999 | Lavey | G01B 7/315 33/203 |
| 2002/0178594 A1* | 12/2002 | Hirano | G01B 5/255 33/203.13 |
| 2009/0031782 A1* | 2/2009 | Jackson | G01B 11/2755 73/1.75 |
| 2018/0001695 A1* | 1/2018 | Liu | B23B 7/12 |
| 2018/0313723 A1* | 11/2018 | Oblizajek | G01M 17/021 |
| 2019/0033159 A1* | 1/2019 | Lv | G01M 1/16 |
| 2019/0126363 A1* | 5/2019 | Liu | B23C 3/12 |

FOREIGN PATENT DOCUMENTS

| | | |
|---|---|---|
| CN | 104493644 A | 4/2015 |
| CN | 105928476 A | 9/2016 |

\* cited by examiner

WHEEL RUNOUT DETECTION DEVICE

CROSS-REFERENCE TO RELATED APPLICATIONS

This application claims priority to Chinese Patent Application No. 2017106355415, filed on Jul. 31, 2017, which is hereby incorporated by reference in its entirety.

TECHNICAL FIELD

The present application relates to a wheel detection device, specifically to a device for detecting wheel runout with high precision.

BACKGROUND ART

With rapid development of automobile industry, the requirements of various large automobile factories in the world market for automobiles are increasingly high. Wheels serving as important components of an automobile are important parts meeting the requirements of the whole automobile for safety, comfort, energy conservation, attractiveness, low noise and the like. Aluminum alloy wheels are widely applied to automobiles due to the characteristics of excellent material performance, light weight, good heat dissipation, rich and attractive appearance styles and the like.

SUMMARY OF THE INVENTION

The present application is aimed at providing a wheel runout detection device.

In order to fulfill the above aim, the present application adopts the following technical solution: A wheel runout detection device in the present application includes a frame, a bottom plate, a base, bearings, a spacing ring, a shaft sleeve, a bearing end cover, a flange plate, a flange, an expansion core, an expansion sleeve, a pull rod, a cylinder, a connecting shaft, a synchronous gear A, a synchronous belt, a synchronous gear B and a servo motor. The bottom plate and the servo motor are fixed on the frame, the base is fixed on the bottom plate, the two bearings and the spacing ring are closed in the base by the bearing end cover, the two bearings are connected by the spacing ring, the shaft sleeve is connected with the bearings, two ends of the shaft sleeve are respectively connected with the synchronous gear A and the flange plate, the synchronous gear B is mounted on the output shaft of the servo motor, the synchronous gear A is connected with the synchronous gear B via the synchronous belt, the flange, the expansion sleeve and the cylinder are mounted on the flange plate, two ends of the connecting shaft are respectively connected with the output shaft of the cylinder and the expansion core, the outer diameter of the expansion core is of an inverse cone structure—, the inner wall of the expansion core is of a positive cone structure, and the outer diameter inverse cone surface and inner wall positive cone surface of the expansion core are respectively matched with an upper positive cone surface of the expansion sleeve and an upper inverse cone structure of the flange plate. The cylinder pulls the expansion core down, and through cone surface fits between the expansion core and the expansion sleeve and between the expansion core and the flange plate, the outer diameter of the expansion sleeve is expanded, so that the central hole of a wheel is tightened and high-precision radial positioning of the wheel is realized. The servo motor drives the flange, the expansion sleeve and the wheel to rotate via the synchronous gear A, the synchronous belt and the synchronous gear B.

In actual use, when a wheel is put onto this device, the central hole of the wheel is aligned with the expansion sleeve, the cylinder pulls the expansion core down via the pull rod, and through cone surface fits between the expansion core, and the expansion sleeve and between the expansion core and the flange plate, the outer diameter of the expansion sleeve is expanded, so that the central hole of the wheel is tightened and high-precision radial positioning of the wheel is realized. The servo motor drives the flange, the expansion sleeve and the wheel to rotate via the synchronous gear A, the synchronous belt and the synchronous gear B, and then runout of the bead seat of the wheel is detected via a special instrument.

The present application may meet the requirement of wheel runout detection in use, and has the characteristics of ideal effect, high efficiency and high working safety and reliability.

Figure 1:
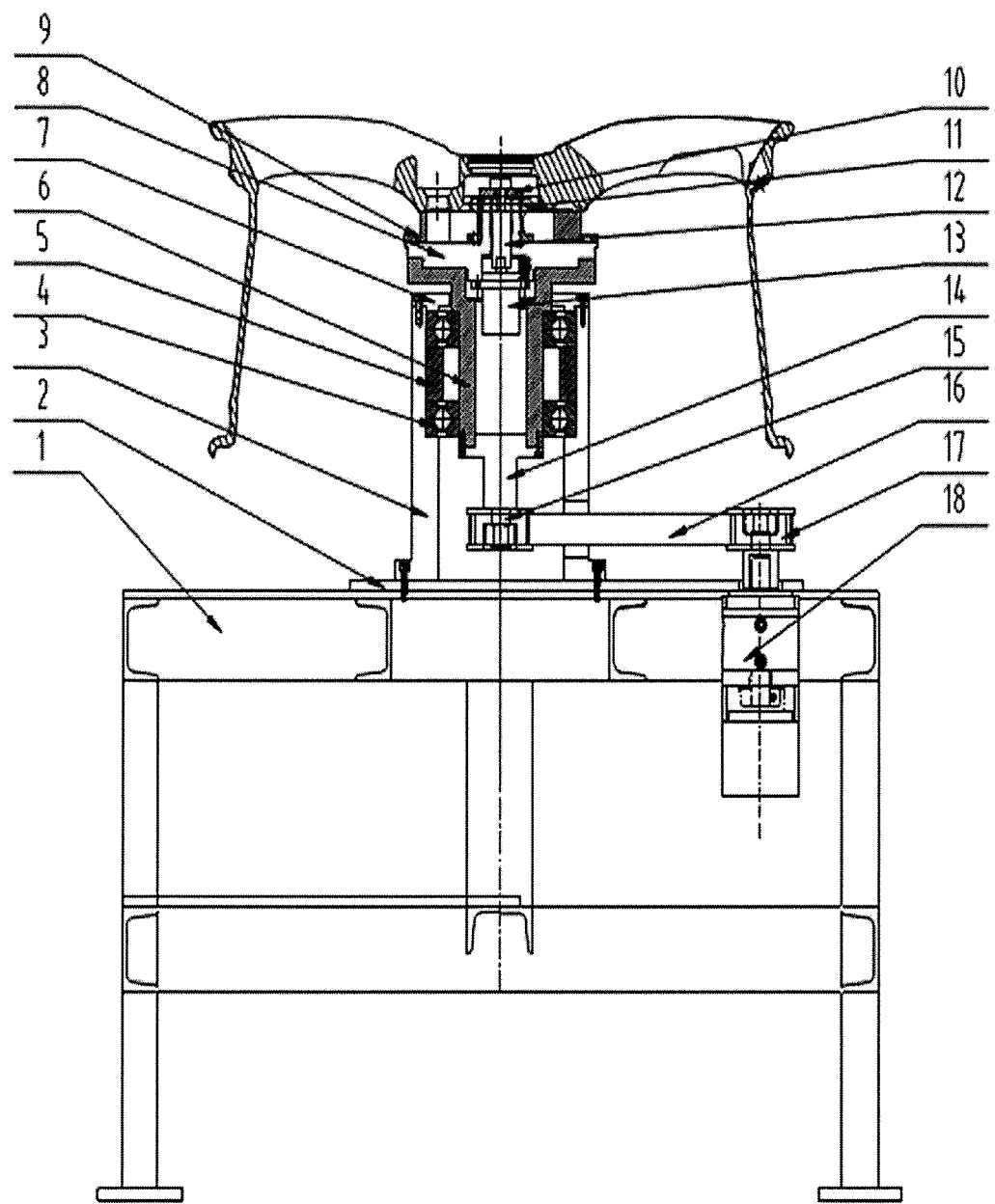
FIG. 1 is a structural schematic diagram of a wheel runout detection device of the present application.
Figure 2:
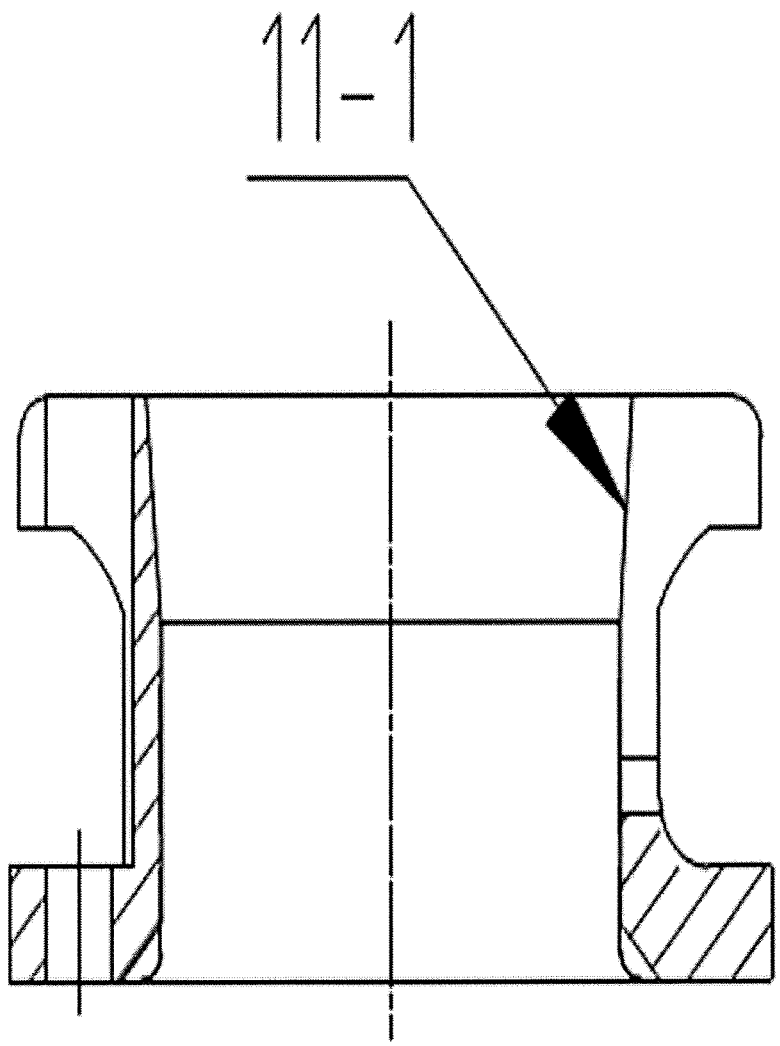
FIG. 2 is a structural schematic diagram of an expansion sleeve in the wheel runout detection device of the present application.
Figure 3:
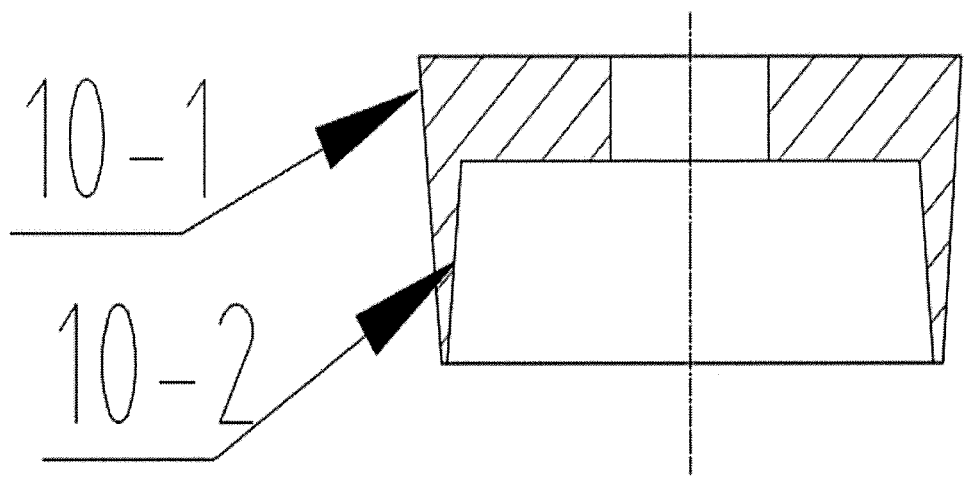
FIG. 3 is a structural schematic diagram of an expansion core in the wheel runout detection device of the present application.
Figure 4:
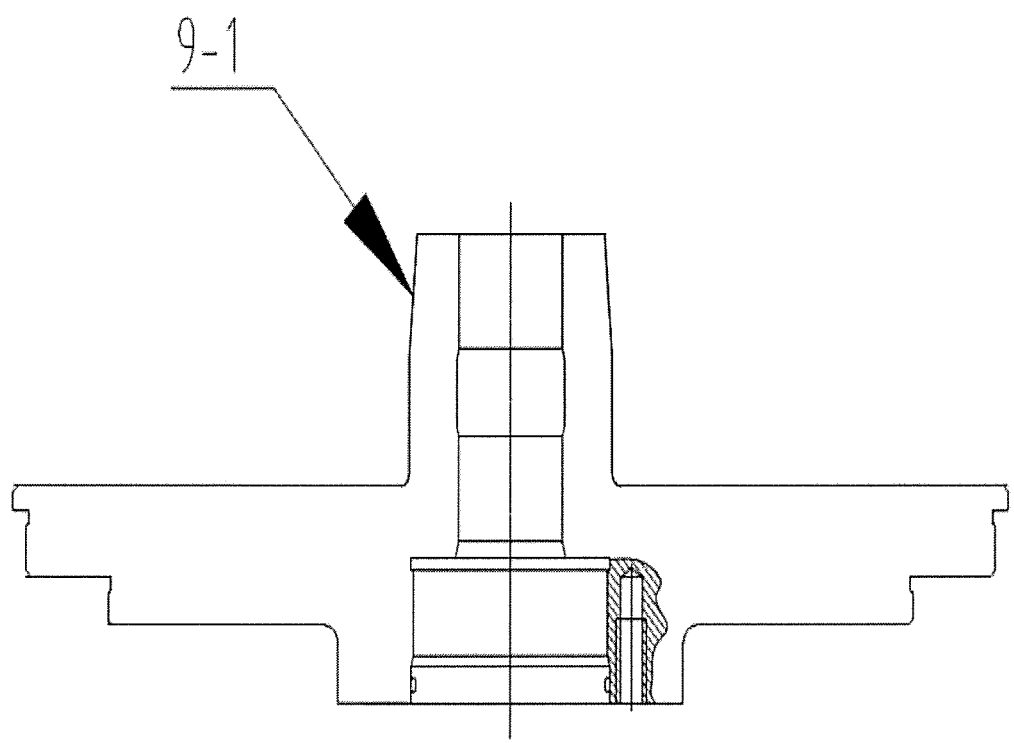
FIG. 4 is a structural schematic diagram of a flange in the wheel runout detection device of the present application.

In figures: 1—frame, 2—bottom plate, 3—base, 4—bearings, 5—spacing ring, 6—shaft sleeve, 7—bearing end cover, 8—flange plate, 9—flange, 10—expansion core, 11—expansion sleeve, 12—pull rod, 13—cylinder, 14—connecting shaft, 15—synchronous gear A, 16—synchronous belt, 17—synchronous gear B, 18—servo motor.

DETAILED DESCRIPTION OF THE INVENTION

Details and working conditions of a specific device provided by the present application will be described in detail below in combination with the accompanying drawings.

A wheel runout detection device in the present application includes a frame 1, a bottom plate 2, a base 3, bearings 4, a spacing ring 5, a shaft sleeve 6, a bearing end cover 7, a flange plate 8, a flange 9, an expansion core 10, an expansion sleeve 11, a pull rod 12, a cylinder 13, a connecting shaft 14, a synchronous gear A 15, a synchronous belt 16, a synchronous gear B 17 and a servo motor 18. The bottom plate 2 and the servo motor 18 are fixed on the frame 1, the base 3 is fixed on the bottom plate 2, the two bearings 4 and the spacing ring 5 are closed in the base 3 by the bearing end cover 7, the two bearings 4 are connected by the spacing ring 5, the shaft sleeve 6 is connected with the bearings 4, two ends of the shaft sleeve 6 are respectively connected with the synchronous gear A 15 and the flange plate 8, the synchronous gear B 17 is mounted on the output shaft of the servo motor 18, the synchronous gear A 15 is connected with the synchronous gear B 17 via the synchronous belt 16, the flange 9, the expansion sleeve 11 and the cylinder 13 are mounted on the flange plate 8, two ends of the connecting shaft 14 are respectively connected with the output shaft of the cylinder 13 and the expansion core 10, the outer diameter of the expansion core 10 is of an inverse cone structure 10-1, the inner wall of the expansion core 10 is of a positive cone structure 10-2, and the outer diameter inverse cone surface 10-1 and the inner wall positive cone surface 10-2 of the expansion core 10 are respectively matched with an upper positive cone surface 11-1 of the expansion sleeve 11 and an upper inverse cone structure 8-1 of the flange plate 8. The cylinder 13 pulls the expansion core 10 down, and through cone surface fits between the expansion core 10 and the expansion sleeve 11 and between the expansion core 10 and the flange plate 8, the outer diameter of the expansion sleeve 11 is expanded, so that the central hole of a wheel is tightened and high-precision radial positioning of the wheel is realized. The servo motor 18 drives the flange 9, the expansion sleeve 11 and the wheel to rotate via the synchronous gear A 15, the synchronous belt 16 and the synchronous gear B 17.

In actual use, when a wheel is put onto this device, the central hole of the wheel is aligned with the expansion sleeve 11, the cylinder 13 pulls the expansion core 10 down via the pull rod 12, and through cone surface fits between the expansion core 10 and the expansion sleeve 11 and between the expansion core 10 and the flange plate 8, the outer diameter of the expansion sleeve 11 is expanded, so that the central hole of the wheel is tightened and high-precision radial positioning of the wheel is realized. The servo motor 18 drives the flange 9, the expansion sleeve 11 and the wheel to rotate via the synchronous gear A 15, the synchronous belt 16 and the synchronous gear B 17, and then runout of the bead seat of the wheel is detected via a special instrument.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel runout detection device, comprising a frame, a bottom plate, a base, bearings, a spacing ring, a shaft sleeve, a bearing end cover, a flange plate, a flange, an expansion core, an expansion sleeve, a pull rod, a cylinder, a connecting shaft, a synchronous gear A, a synchronous belt, a synchronous gear B and a servo motor, wherein the bottom plate and the servo motor are fixed on the frame, the base is fixed on the bottom plate, the two bearings and the spacing ring are closed in the base by the bearing end cover, the two bearings are connected by the spacing ring, the shaft sleeve is connected with the bearings, two ends of the shaft sleeve are respectively connected with the synchronous gear A and the flange plate, the synchronous gear B is mounted on an output shaft of the servo motor, the synchronous gear A is connected with the synchronous gear B via the synchronous belt, the flange, the expansion sleeve and the cylinder are mounted on the flange plate, two ends of the connecting shaft are respectively connected with an output shaft of the cylinder and the expansion core, the outer diameter of the expansion core is of an inverse cone structure, the inner wall of the expansion core is of a positive cone structure, and the outer diameter inverse cone surface and the inner wall positive cone surface of the expansion core are respectively matched with an upper positive cone surface of the expansion sleeve and an upper inverse cone structure of the flange plate; the cylinder pulls the expansion core down, and through cone surface fits between the expansion core and the expansion sleeve and between the expansion core and the flange plate, the outer diameter of the expansion sleeve is expanded, so that the central hole of a wheel is tightened and high-precision radial positioning of the wheel is realized; the servo motor drives the flange, the expansion sleeve and the wheel to rotate via the synchronous gear A, the synchronous belt and the synchronous gear B.

* * * * *